United States Patent
Riemers et al.

(10) Patent No.: US 9,420,046 B2
(45) Date of Patent: Aug. 16, 2016

(54) NETWORKED PROJECTION DISPLAY ADAPTER

(75) Inventors: Bill C. Riemers, Stoney Creek (CA); James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 477 days.

(21) Appl. No.: 12/324,753

(22) Filed: Nov. 26, 2008

(65) Prior Publication Data

US 2010/0131662 A1    May 27, 2010

(51) Int. Cl.
| | |
|---|---|
| G06F 15/16 | (2006.01) |
| H04L 29/08 | (2006.01) |
| G03B 21/00 | (2006.01) |
| H04L 29/06 | (2006.01) |

(52) U.S. Cl.
CPC .............. *H04L 67/16* (2013.01); *G03B 21/00* (2013.01); *H04L 67/125* (2013.01); *H04L 67/38* (2013.01)

(58) Field of Classification Search
CPC ...... G03B 21/00; H04L 67/38; H04L 67/125; H04L 67/16

USPC .......................... 709/204, 217, 227, 228, 229
See application file for complete search history.

(56) References Cited

U.S. PATENT DOCUMENTS

| | | | |
|---|---|---|---|
| 2003/0028637 A1* | 2/2003 | Gross ............................. 709/225 |
| 2004/0015401 A1* | 1/2004 | Lee et al. ......................... 705/16 |
| 2005/0043973 A1* | 2/2005 | Childers ........................... 705/5 |
| 2006/0050240 A1* | 3/2006 | Castaldi et al. ................. 353/30 |
| 2009/0153750 A1* | 6/2009 | Tsunashima .................. 348/744 |
| 2010/0107018 A1* | 4/2010 | Benenson ....................... 714/57 |

FOREIGN PATENT DOCUMENTS

EP    1427144 A1 *  6/2004

* cited by examiner

*Primary Examiner* — Cheikh Ndiaye
(74) *Attorney, Agent, or Firm* — Lowenstein Sandler LLP

(57) ABSTRACT

A networked projector system includes a projection display device, a projector computer, and a network adapter. The projector computer negotiates an IP address of a local network, and periodically broadcasts the IP address on the local network. The network adapter connects with a client on the local network with the IP address.

17 Claims, 4 Drawing Sheets

NETWORKED PROJECTION DISPLAY ADAPTER

TECHNICAL FIELD

Embodiments of the present invention relate to computing systems, and more particularly, to networked display adapter.

BACKGROUND

In recent years, projectors, such as digital projectors, have found increased popularity as a tool for the presentation of content to an audience. The projectors are typically used to project a computer-generated presentation onto a viewing surface, and allow a user to easily present high-quality, professional appearing images to audiences of a range of sizes. As a result, such projectors are now often found as permanent fixtures in conference rooms and other meeting facilities.

A presentation may be provided to a projector for display in any one of a number of ways. Typically, a user connects a portable computer, on which the presentation may be stored, directly to the projector. Alternatively, a meeting room may be provided with a dedicated computer linked to the projector that a user may use to access their presentation. In some embodiments, the dedicated computer may be linked to a network such that a user is able to access presentations stored on the network.

The advantages offered by such a network-linked projector system may not by fully realized if a user has difficulty accessing the dedicated computer or projector. For example, complicated configuration settings may cause the user to have difficulty connecting his computer to the projector. Therefore, there remains a need for a networked projector display system that provides a user with a simple adapter that allows easy access to the projector display.

BRIEF DESCRIPTION OF THE DRAWINGS

The present invention is illustrated by way of example, and not by way of limitation, in the figures of the accompanying drawings and in which.

DETAILED DESCRIPTION

Described herein is a networked projector system. In one embodiment, the networked projector system includes a projection display device, a projector computer, and a network adapter. The projector computer negotiates an IP address of a local network, and periodically broadcasts the IP address on the local network. The network adapter connects with a client on the local network with the IP address.

Figure 1:
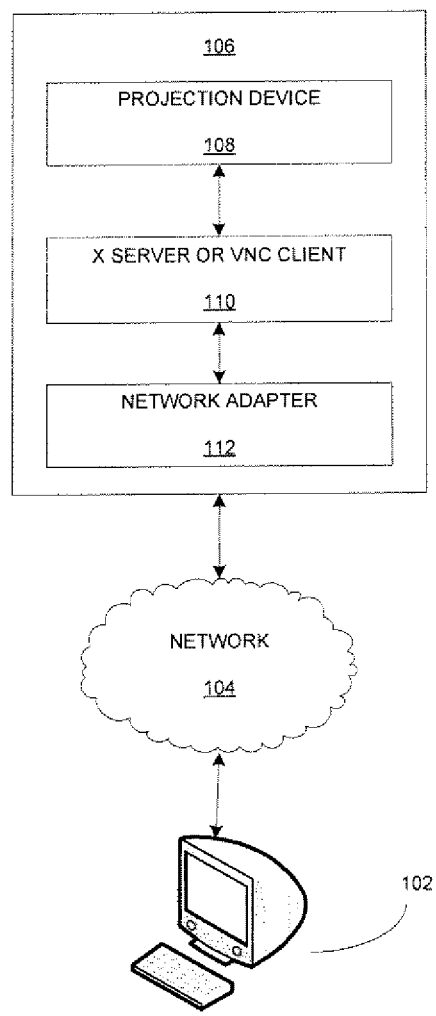
FIG. 1 is a block diagram illustrating one embodiment of a system in which the network projection display adapter may be implemented.

FIG. 1 is a block diagram illustrating one embodiment of a system in which the network projection display adapter may be implemented. A client 102 communicates with a projection display system 106 via a network 104. Client 102 can be any type of computer device including a desktop computer, laptop computer, handheld computer, console device or similar computing device. In one embodiment, projection display system 106 includes a standalone network appliance capable of providing services. For example, projection display system 106 may include an X11 server or a VNC client. Client 102 and projection display system 106 can communicate over network 104. Network 104 can be a wide area network (WAN), such as the Internet, a local area network (LAN) or similar network. Network 104 can include any number of computers and network devices. Network 104 can include any combination of wired and wireless communication lines and devices.

Projection display system includes a projection device 108, a computer 110, and a network adapter 112. Projection device 108 may be any suitable type of data video projectors that are capable of projecting images onto a display surface. For example, projection device 108 may use any desired type of image production systems, including, but not limited to, liquid crystal displays (LCDs), digital mirror devices (DMDs), liquid crystal on silicon (LCOS) devices, and/or cathode ray tubes (CRTs). In another embodiment, projection display system includes multiple projection devices that may be located remotely from other network components. For example, multiple presentation rooms may each have a networked projection device. The projection devices may either be fixed installation projectors that are permanently located in a meeting room, or may be removable or portable devices. Since each projection device is configured to be linked to network computer 110, presentations or presentation files from network projection computer 110 may be displayed directly from the system by any one of the linked projection devices.

Projection device 108 is coupled to computer 110. Computer 110, as used herein, includes any internal or external computing device coupled with the projection device 108 and the network 104 where computer 110 is able to read and present the presentation files stored on a client on the network. Computer 110 may take a variety of different forms. For example, computer 110 may be a stand-alone unit, external of the projection device 108, such as a desktop personal computer or a portable personal computer (such as a laptop or personal digital assistant). Alternatively, computer 110 may be integrated within projection device 108. For example, projector computer 110 may be an embedded card contained within the projection device 108. Such computers may be linked to network 104 and projection device 108 via network adapter 112, or any type of wired or wireless communication links, including serial cables, universal serial bus (USB) cables, and/or other wired or wireless links.

In one embodiment, computer 110 includes a network appliance such as an X11 server or a VNC client with a web application server built into it. Upon powering computer 110, it automatically negotiates over each network adapter 112 to obtain an IP address. Once it has the IP address, computer 110 periodically sends broadcast packets to its subnet (for example, if it's assigned IP address 10.1.2.3/24, it would broadcast the packets to 10.1.2.255). The broadcast packet is to let systems on the network know its IP address. Once the appliance is up and running, a user on the same network can connect to the built in web app server to configure the display. Configuration would include connection parameters for the X client and/or VNC server, plus the usual configuration things for a display (brightness, contrast, focus, etc).

Figure 2:
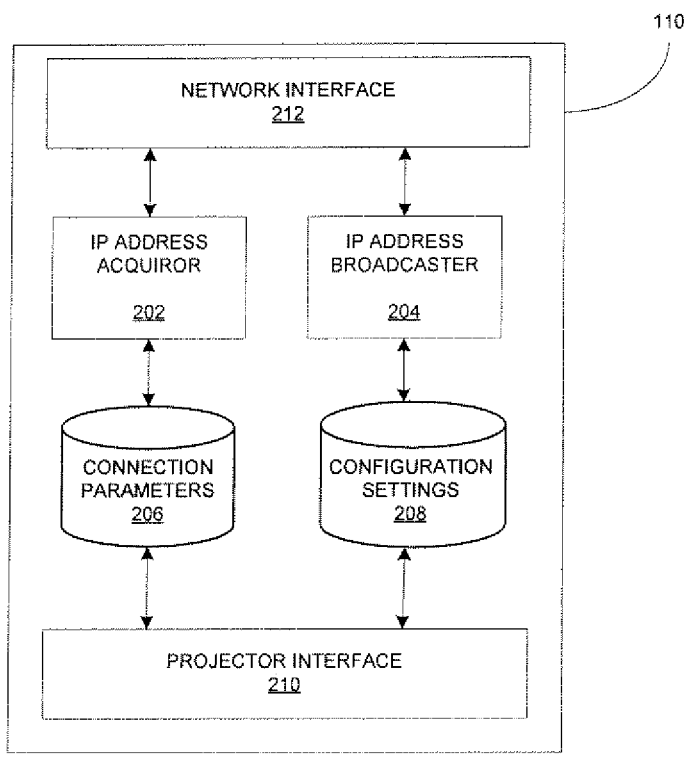
FIG. 2 is a block diagram illustrating one embodiment of a networked projection display adapter.

FIG. 2 is a block diagram illustrating one embodiment of a networked projection display adapter. Computer 110 includes a network interface 212, an IP address acquiror 202, an IP address broadcaster 204, a connection parameters storage 206, a configuration settings storage 208, and a projector interface 210.

Network interface 212 communicates with network adapter 112 and allows computer 110 to communicate with other clients in network 104. IP address acquiror 202 is configured to negotiate and obtain an IP address on the network 104. IP address broadcaster 204 is configured to periodically broadcast the acquired IP address from IP address acquiror 202. Connection parameters storage 206 is configured to store connection parameters for computer 110. Configuration settings storage is configured to store configuration settings for projection device 108 (brightness, contrast, focus, etc. . . . ).

In another embodiment, projection display system may also include a media playing software to allow a user to just upload a movie or presentation, and let the projection display system handle the display aspects of it. The user would not even need to be able to use the media files on their own computer.

Having independent media handling capability also means the networked projector could operate independently of the computer where the media originated. A user could upload his presentation and then shut down his laptop, for example, relying on either internal timing in the presentation, or some other control mechanism to advance it as necessary (perhaps another computer). It also means the user could direct the projector to download the media, rather than providing and processing the media with his own computer.

Figure 3:
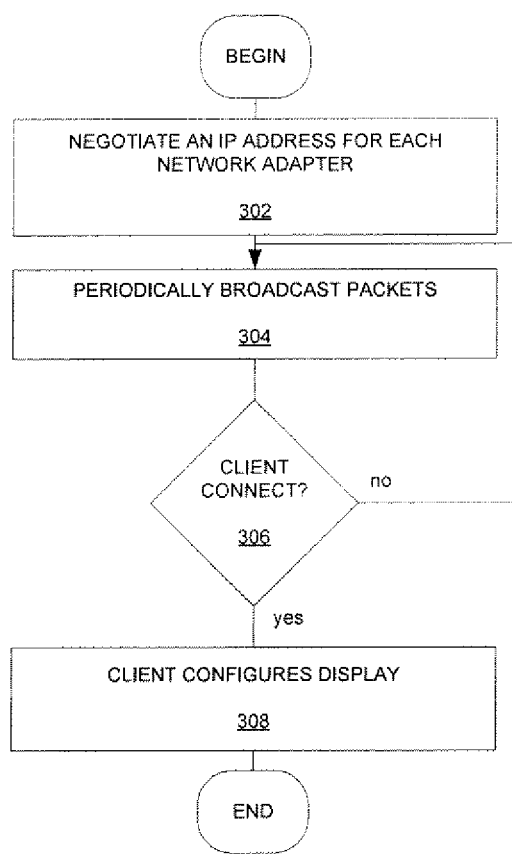
FIG. 3 is a flow diagram illustrating one embodiment of a method for connecting a networked projection display adapter.

FIG. 3 is a flow diagram illustrating one embodiment of a method for connecting a networked projection display adapter. At 302, a networked projection system negotiates an IP address of a local network for a network adapter. At 304, the networked projection system periodically broadcasting the IP address on the local network. In one embodiment, the networked projection system broadcasts packets on a subnet of the assigned IP address on the local network. At 306, a client attempts to communicate with the networked projection system. The networked projection system connects with the client with network adapter on the assigned IP address. At 308, client configures the display device of networked projection system. In one embodiment, the networked projector system includes a projection device and a computer coupled to the network adapter. At 308, client configures configurating network connection parameters with the networked projection system and display parameters of the projection device. In one embodiment, the computer includes an X server or a VNC client.

Figure 4:
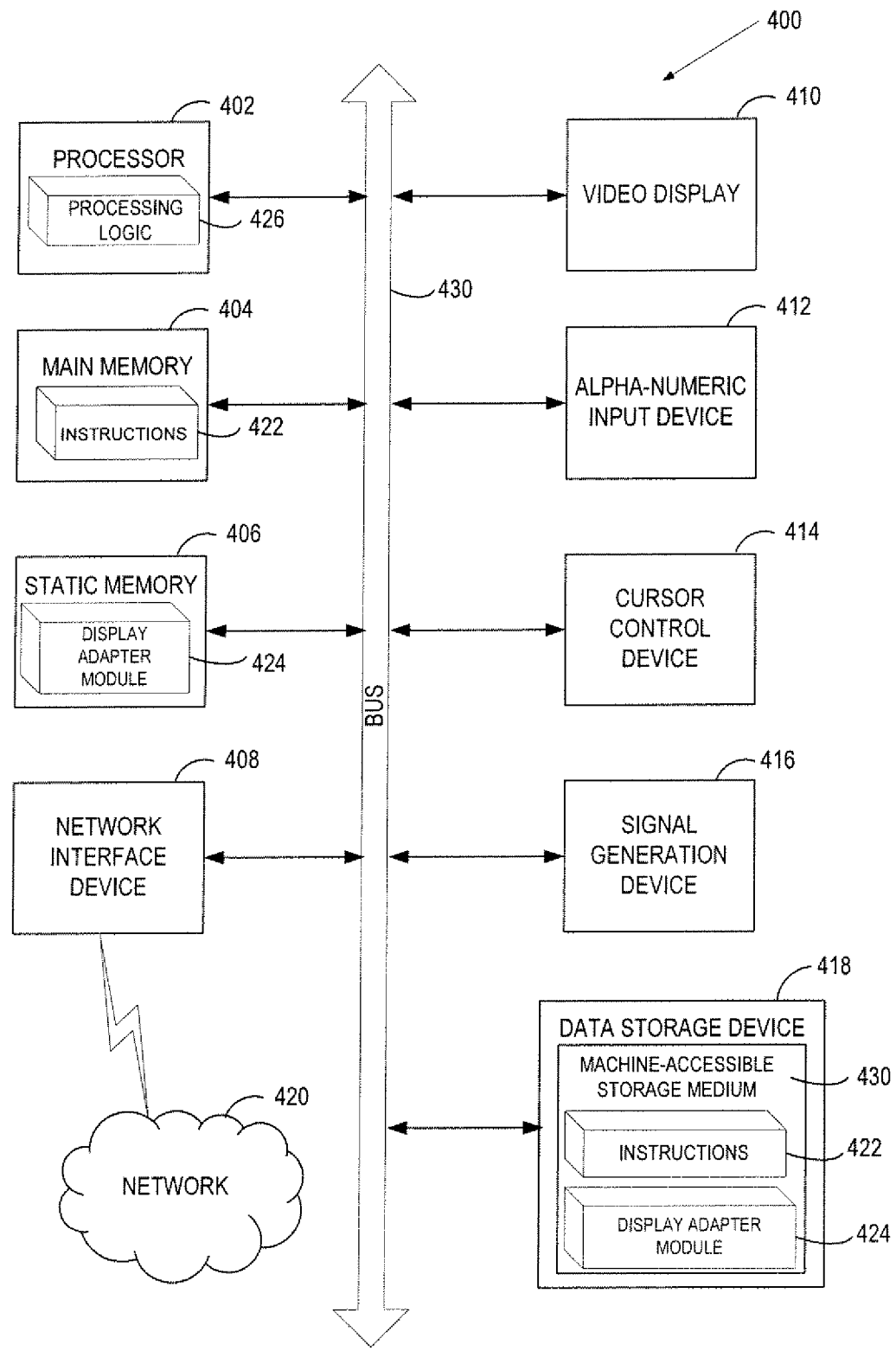
FIG. 4 is a block diagram illustrating an example of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store the diff module 424 as presently described. The diff module 424 may also be stored in other sections of computer system 400, such as static memory 406.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    negotiating, by a processing device, an IP address of a local network for a network adapter of a networked projector system, wherein the networked projector system comprises a web server to configure parameters of the networked projector system, wherein the parameters comprise a connection parameter for a VNC client with a web application server of the networked projector system;
    periodically broadcasting, by the processing device, the IP address on the local network by broadcasting packets on a subnet of the IP address on the local network;
    connecting, by the processing device, with a client on the local network with the network adapter with the IP address; and
    downloading, by the processing device, a media file specified by the client to the networked projector system, wherein a presentation of the media file is advanced by the networked projector system in view of internal timing of the downloaded media file.

2. The method of claim 1 wherein the networked projector system further comprises:
    a projection device; and
    a computer coupled to the projection device and to the network adapter.

3. The method of claim 2 wherein connecting further comprises:
    configuring network connection parameters with the client, using the web server; and
    configuring display parameters of the projection device with the client, using the web server, wherein the display parameters comprise a brightness parameter, a contrast parameter, and a focus parameter.

4. The method of claim 2 wherein the computer comprises an X server.

5. The method of claim 1 wherein the network adapter is to wirelessly connect with the local network.

6. The method of claim 1 wherein the network adapter is to connect with the local network with wires.

7. A system comprising:
    a projector computer coupled to a projection display device, the projector computer to negotiate an IP address of a local network, to periodically broadcast the IP address on the local network by broadcasting packets on a subnet of the IP address on the local network, and to download a media file specified by a client to the projector computer, wherein a presentation of the media file is advanced by the projector computer in view of internal timing of the downloaded media file, wherein the projector computer comprises a web server to configure parameters for at least one of the projection display device and the projector computer, wherein the parameters comprise a connection parameter for a VNC client with a web application server of the projector computer; and
    a network adapter coupled to the projector computer, the network adapter to connect with the client on the local network with the IP address.

8. The system of claim 7 wherein the projector computer is to configure network connection parameters and display parameters of the projection device with the client based on data received by the web server, wherein the display parameters comprise a brightness parameter, a contrast parameter, and a focus parameter.

9. The system of claim 8 wherein the projector computer comprises an X server.

10. The system of claim 7 wherein the network adapter is to wirelessly connect with the local network.

11. The system of claim 7 wherein the network adapter is to connect with the local network with wires.

12. A non-transitory computer-readable storage medium, having instructions stored therein, which when executed, cause a processing device to:
- negotiate an IP address of a local network for a network adapter of a networked projector system, wherein the networked projector system comprises a web server to configure parameters for the networked projector system, wherein the parameters comprise a connection parameter for a VNC client with a web application server of the networked projector system;
- periodically broadcast, by the processing device, the IP address on the local network by broadcasting packets on a subnet of the IP address on the local network;
- connect with a client on the local network with the network adapter with the IP address; and
- download, to the networked projector system, a media file specified by the client, wherein a presentation of the media file is advanced by the networked projector system in view of internal timing of the downloaded media file.

13. The non-transitory computer-readable storage medium of claim 12 wherein the networked projector system further comprises:
- a projection device; and
- a computer coupled to the projection device and to the network adapter.

14. The non-transitory computer-readable storage medium of claim 13 wherein to connect with the client, the processing device is further to:
- configure network connection parameters with the client, using the web server; and
- configure display parameters of the projection device with the client, using the web server, wherein the display parameters comprise a brightness parameter, a contrast parameter, and a focus parameter.

15. The non-transitory computer-readable storage medium of claim 13 wherein the computer comprises an X server.

16. The non-transitory computer-readable storage medium of claim 12 wherein the network adapter is to wirelessly connect with the local network.

17. The non-transitory computer-readable storage medium of claim 12 wherein the network adapter is to connect with the local network with wires.

* * * * *